United States Patent [19] [11] Patent Number: 4,768,624
Green et al. [45] Date of Patent: Sep. 6, 1988

[54] SELF-ENERGIZING DISC BRAKES WITH CABLE ASSEMBLY AND CABLE CASING THEREFOR

[75] Inventors: Andrew P. Green; Anthony G. Price, both of Gwent, Wales; Roy Campbell, Worcestershire, England

[73] Assignee: Lucas Industries, Birmingham, England

[21] Appl. No.: 96,369

[22] Filed: Sep. 11, 1987

[30] Foreign Application Priority Data

Sep. 11, 1986 [GB] United Kingdom ............... 8621945
Sep. 15, 1986 [GB] United Kingdom ............... 8622152

[51] Int. Cl.⁴ ...................... F16D 55/04; F16D 55/18
[52] U.S. Cl. ............................... 188/71.4; 188/2 D; 188/72.2; 188/72.7; 188/72.9; 192/70; 192/93 A
[58] Field of Search ............... 188/71.4, 72.2, 71.3, 188/2 D, 106 F, 72.7, 72.8, 72.9; 192/70, 93 A, 83, 93 R, 70.23; 74/501.5 R

[56] References Cited

U.S. PATENT DOCUMENTS

| | | | |
|---|---|---|---|
| 3,638,763 | 2/1972 | Laverdart | 188/72.7 X |
| 3,952,843 | 4/1976 | Campbell et al. | 188/71.4 |
| 4,213,519 | 7/1980 | Moser et al. | 188/71.4 |
| 4,422,533 | 12/1983 | Price | 188/71.4 |
| 4,442,923 | 4/1984 | Wakatsuki et al. | 188/2 D X |
| 4,549,636 | 10/1985 | Price et al. | 188/71.4 |
| 4,550,810 | 11/1985 | Price et al. | 188/71.4 |
| 4,702,351 | 10/1987 | Price et al. | 188/71.4 |
| 4,711,327 | 12/1987 | Price et al. | 188/72.2 X |

Primary Examiner—Douglas C. Butler
Attorney, Agent, or Firm—Oldham & Oldham Co.

[57] ABSTRACT

A self-energizing disc brake of the spreading type is adapted to be applied by a cable assembly. The cable assembly acts through a lever which is disposed in a plane lying between a pair of pressure plates in order to move the plates angularly in opposite directions.

14 Claims, 8 Drawing Sheets

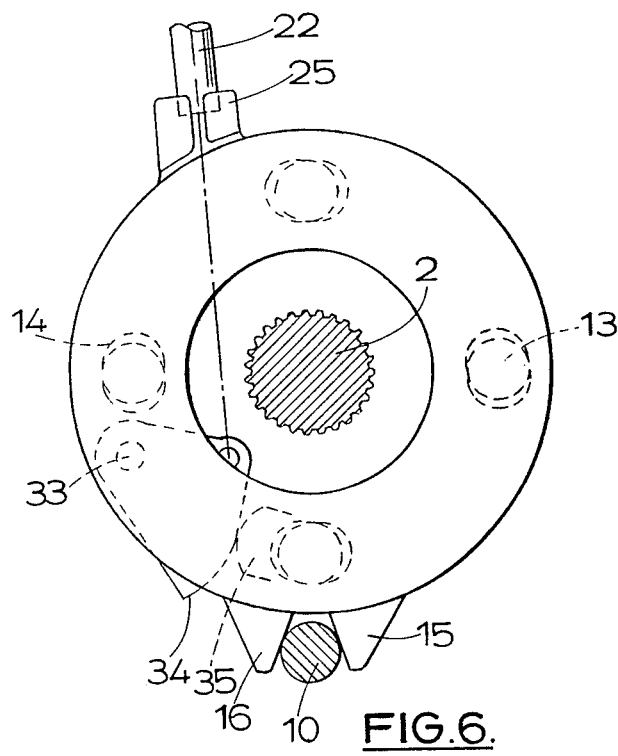
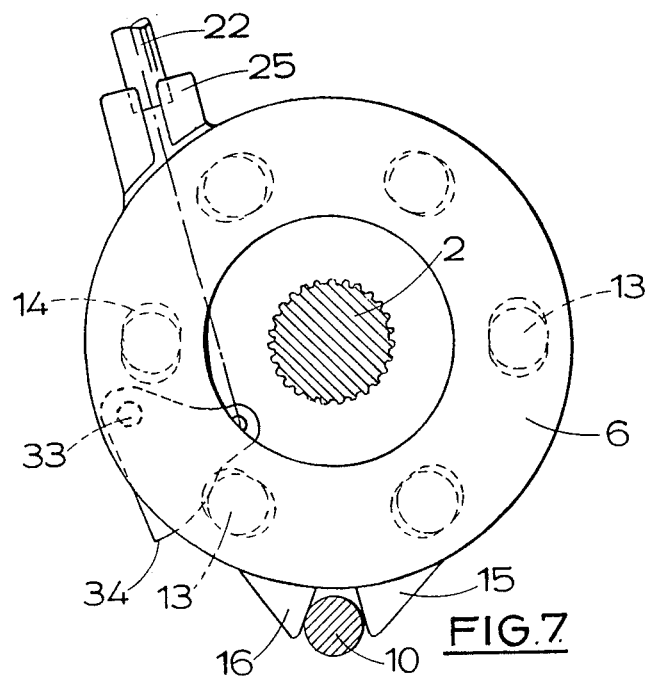

SELF-ENERGIZING DISC BRAKES WITH CABLE ASSEMBLY AND CABLE CASING THEREFOR

This invention relates to self-energising disc brakes of the kind in which rotatable friction discs provided with friction linings are adapted to be brought into engagement with spaced opposed braking surfaces in a housing by first and second pressure plates located between the friction discs and centred by stationary pilot lugs, application of the brake being initiated by angular movement of the pressure plates effected by operation of a brake-applying mechanism, balls or rollers being located in co-operating oppositely inclined recesses in the adjacent faces of the plates such that on operation of the brake-applying mechanism to move the pressure plates angularly in opposite directions, the engagement of the balls or rollers and the recesses causes the pressure plates to move apart into engagement with the friction discs which are urged into engagement with the braking surfaces, the pressure plates being carried round with the friction discs until one is arrested by the engagement of a lug on the plate with a drag-taking stop abutment in the housing and the continued angular movement of the other pressure plate provides a servo action.

Self-energising brakes of the kind set forth may be dry or they may be of the liquid cooled type, and such brakes are commonly used in tractors and like vehicles.

In known brakes of the kind set forth the brake-applying mechanism may comprise links which are pivotally connected to radially projecting lugs on the plates and through which a brake-applying force, for example from a pedal, is applied to the plates when a pull-rod, which is pivotally connected to the links, is moved in a radial direction. In another arrangement a cam is carried by a cam shaft which is rotatable within a radial bore in the housing, and the cam acts on the lugs on the plates through rocking thrust members or dollies which are moved relatively apart to separate the lugs in response to rotation of the cam shaft.

We are aware of G.B. No. 1 276 617 which discloses a wheel cylinder for applying a friction pad to a rotatable disc. The wheel cylinder comprises a piston for applying the pad directly to the disc for normal service braking. The cylinder incorporates an adjuster operable in combination with mechanical means for applying the brake mechanically for parking or in an emergency. The mechanical means comprises a pair of members, and balls are located in co-operating pairs of complementary recesses in adjacent faces of the members. When the members are moved angularly relative to each other by the operation of a cable assembly acting between radial arms on the members and lying in a plane parallel to the plane of the disc, this relative angular movement is accompanied by the inner member moving relatively away from the outer member and acting through the piston to apply the pad to the disc.

We are also aware of G.B. No. 1 531 168 which discloses a disc brake of the kind set forth in which angular movement of the pressure plates to initiate application of the brake is affected by means of a lever located in a plane which is tangential to the plates and which has a pair of abutments engaging between radially projecting lugs on the plates. The lever is angularly movable to separate the abutments in response to an input force from a brake-applying member in the form of a rod and the input force is reacted between a reaction face on the lever and a bearing face on the housing. Since the input force is reacted by the housing, there may be a change in travel of the brake-applying member in response to forward and reverse angular movements of the pressure plates.

According to our invention, in a self-energising brake of the kind set forth, the brake-applying mechanism comprises a cable-assembly which acts through a lever to move the plates angularly in opposite directions, and the cable assembly comprises an outer casing having an abutment on one of the plates and an internal, inextensible, flexible member which slides in the casing and is coupled to the lever.

The arrangement of the cable assembly and the lever provides a velocity ratio change at the brake. Thus, for a given load at the brake, the load in the cable assembly will be reduced substantially, for example by a factor of at least three, and possibly four. This has the advantage that the cost of the cable assembly can be correspondingly reduced.

Since the casing abuts against an abutment on one of the plates there is no change in travel in the cable assembly between forward and reverse angular movement of the pressure plates.

The lever may be disposed in a plane lying between the plates or, when space in a radial direction has to be conserved, it may lie in a plane which is tangential to the plates.

When the lever is disposed between the plates it may comprise a bell-crank lever of which one arm has a curved nose acting on the plate with which the cable assembly is not in abutment.

In such a combination the lever may by pivotally mounted on the plate carrying the abutment for the cable assembly. Conveniently the lever may co-operate with an abutment face on the other plate. Alternatively the lever may be provided with a curved reaction face which co-operates with an adjacent ball or roller to impart a force to the respective plate by the co-operation of that ball or roller with the recess in the said respective plate. In this latter construction the lever, instead of being pivotally mounted on one of the plates, may be provided with an opening which receives the adjacent ball or roller, and which defines a pivotal connection for the lever between the two plates as the lever is moved angularly by the cable assembly to initiate application of the brake.

The cable assembly may lie on a chord passing between the pressure plates or it may be tangential to the plates.

In another construction in which the lever is tangential to the plates the lever is pivotally connected to both plates, and the free end of the lever which projects axially from the plates is coupled to the inextensible member with the outer casing in abutment with an abutment on one or other of the plates.

Some embodiments of our invention are illustrated in the accompanying drawings in which:

FIG. 6 is a view similar to FIG. 1 but of another modification;

FIG. 7 is another view similar to FIG. 1 but showing yet a further modification;

Figure 1:
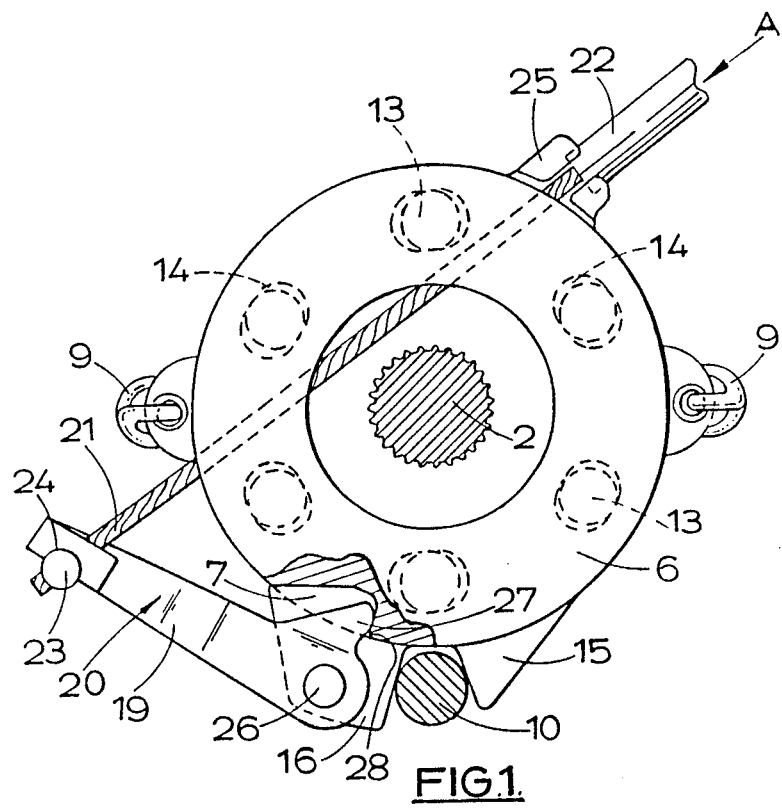
FIG. 1 is an end elevation of a brake of the kind set forth.
Figure 2:
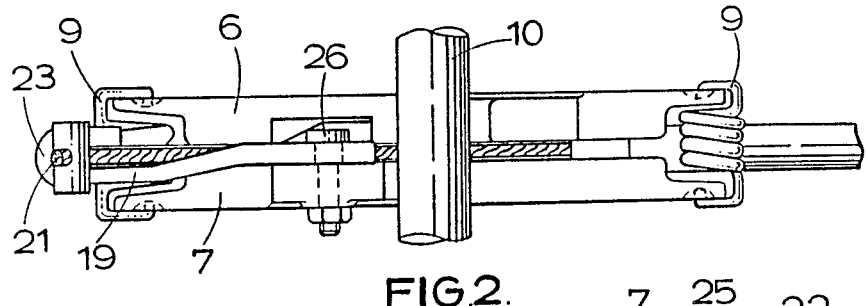
FIG. 2 is an inverted plan view of the brake of FIG. 1.
Figure 3:
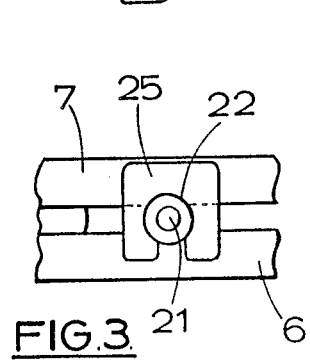
FIG. 3 is a view on arrow "A" in FIG. 1.

The self-energising disc brake illustrated in FIGS. 1–3 of the drawings comprises a housing (not shown) through which a rotatable shaft 2 extends axially. A pair of axially spaced friction discs (not shown) provided on opposite sides with linings of friction material are slidably splined on the shaft 2. The discs are adapted to be brought into engagement with axially spaced radial braking surfaces at opposite ends of the housing by a pair of annular pressure plates 6 and 7 which are located between the discs and are centred by three stationary pilot lugs on the housing of which only one lug 10 is shown. Balls or rollers 13 are located in angularly spaced co-operating oppositely inclined recesses 14 in adjacent faces of the pressure plates 6 and 7. Angularly spaced compression return springs 9 act between the plates 6 and 7 to urge them towards each other.

The application of the brake is initiated by moving the pressure plates 6 and 7 angularly in opposite directions which causes the balls 13 to tend to ride up ramps formed by the walls of recesses 14, and the pressure plates 6, 7 then move apart into engagement with the friction discs to urge them into engagement with the radial surfaces on the housing.

When the discs are rotating in one direction, the plates 6 and 7 are carried round with the discs until one plate is arrested by the engagement of a radial lug 15, 16 on that plate with an adjacent face on a drag-taking stop abutment defined by the adjacent end of the pilot lug 10. Continued angular movement of the other plate provides a servo-action to increase the braking torque.

When the shaft 2 is rotating in the opposite direction and the brake is applied, the sequence described above is repeated except that the angular movement of the other plate is arrested.

The angular movement of the plates 6, 7 to apply the brake is initiated by a brake applying mechanism 20. As illustrated the mechanism comprises a cable assembly, consisting of an inner flexible inextensible member 21 slidably guided for relative sliding movement in an outer flexible inextensible member comprising a casing 22, and a lever 19. The lever 19 comprise a bell-crank having a longer arm and a shorter arm. The inner member 21 projects from the adjacent end of the casing 22 and carries at its outer end a ferrule 23 having a part-spherical face for rocking engagement with a part-spherical face 24 at the base of a recess in the outer end of the longer arm of the lever 19.

The cable assembly 20 lies on a chord passing between the two plates 6 and 7, and the inner end of the casing 22 co-operates with a lug 25 on the plate 7, specifically abutting against an abutment face disposed within the lug 25.

The lever 19 is pivotally mounted on the lug 16 by means of a pivot pin 26, and the outer end of the shorter arm has a curved nose 27 which acts on an abutment face 28 on the plate 6.

In the application of the brake a pull applied to the cable assembly acts to move the lever 19 angularly about the pivot pin 26 as an axis. The engagement of the nose 27 with the face 28, and the reaction on the pin 26, act to move the plates angularly in opposite directions to initiate application of the brake as described above.

The bell-crank lever 19, operating between the two pressure plates 6, 7 provides a velocity ratio change at the brake.

Passing the cable assembly between the two plates 6, 7 facilitates the mounting of the casing 22 on the pressure plate 7.

Figure 4:
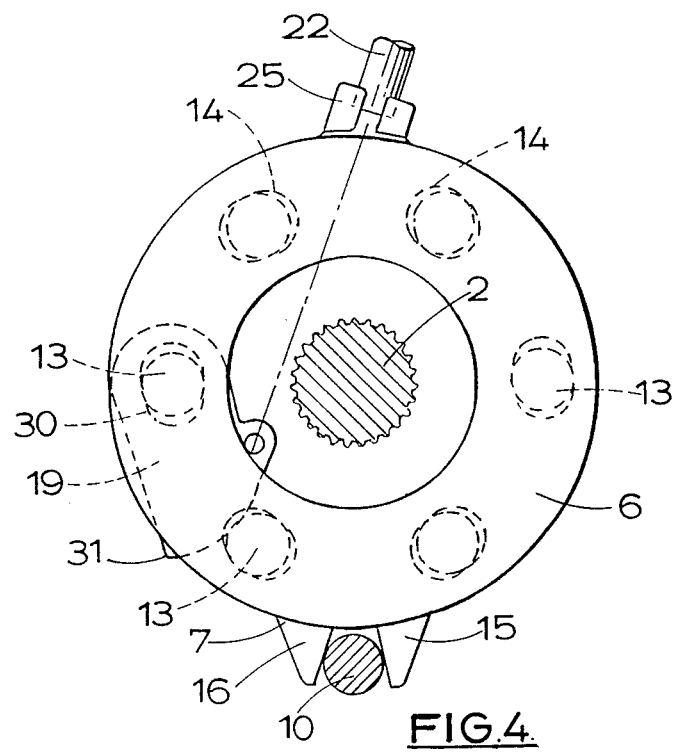
FIG. 4 is a view similar to FIG. 1 but showing a modified construction.

In the modification illustrated in FIG. 4 of the drawings the lever 19 is disposed between the two plates 6 and 7 and comprises a planar member substantially in the form of a quadrant provided with an opening 30 which receives a first one of the balls 13. The lever 19 extends circumferentially as is provided at its free end with an arcuate face 31 for co-operating with the adjacent second ball 13.

The inextensible member 21 is coupled to the lever 19 at an intermediate point in its length.

When the cable assembly acts to move the lever 19 angularly about the first ball as an axis, the arcuate face 31 acts on the second ball 13. The two balls are moved substantially in opposite directions, in turn, to impart corresponding movements to the two pressure plates 6 and 7 through the engagement of the balls 13 with walls at the ends of the respective recesses 14.

Figure 5:
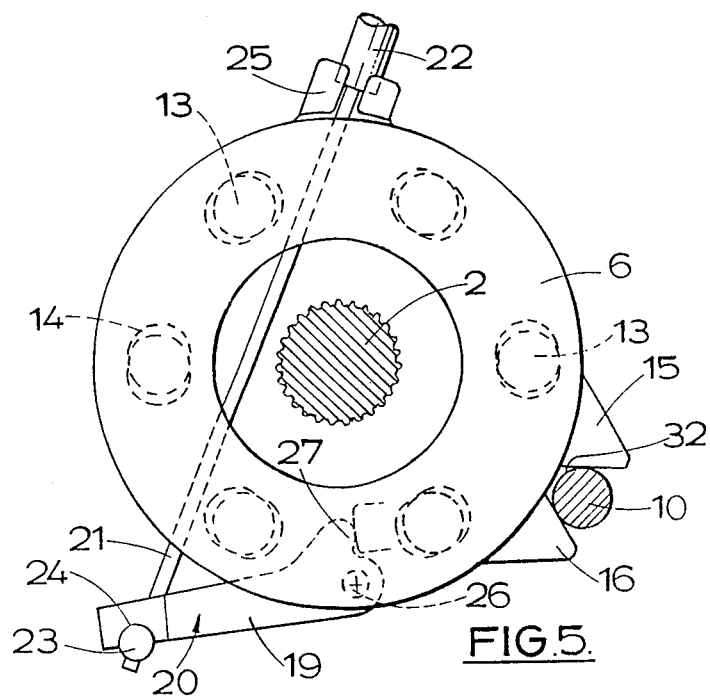
FIG. 5 is a view again such to FIG. 1 but showing another modification.

In the brake shown in FIG. 5, the pivot pin 26 is defined by a pin or a suitable abutment on the plate 7, and the nose 27 co-operates with an internal abutment face 32 on the plate 6.

In the modified construction illustrated in FIG. 6, the lever 19 is again substantially in the form of a quadrant but is pivotally mounted on a pin or abutment 33 on the plate 7, and its arcuate edge 34 co-operates with a raised portion or a cut-out 35 on the internal face of the plate 6.

In the construction illustrated in FIG. 7 the portion or cut-out 35 is omitted from the plate 6, and the arcuate edge co-operates with one of the brakes 13.

Figure 8:
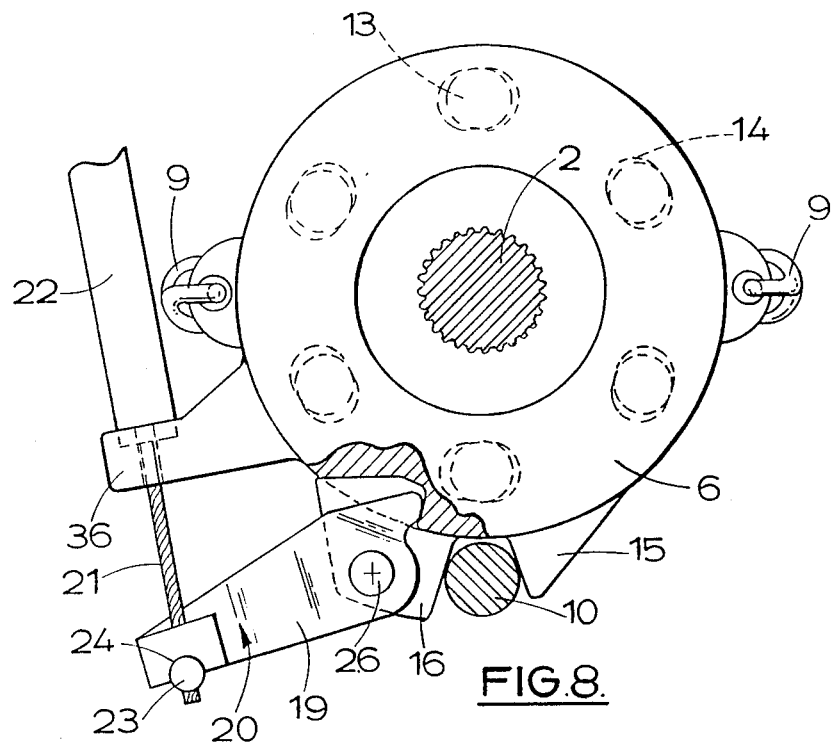
FIG. 8 is an end elevation of another brake of the kind set forth.
Figure 9:
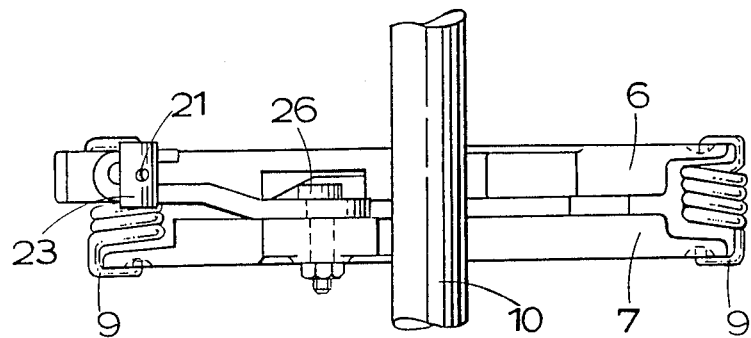
FIG. 9 is an inverted plan view of the brake of FIG. 8.

The brake illustrated in FIGS. 8 and 9 is similar to that of FIGS. 1–3 except that the lug 25 is omitted. In this construction the cable assembly is arranged tangential to the brake, and the inner end of the casing 22 abuts against a radial lug 36 on the plate 7.

In the brakes described above since the casing 22 of the cable abuts against an abutment on one of the pressure plates there is no change in travel between forward and reverse angular movement of the pressure plates 6 and 7.

Figure 10:
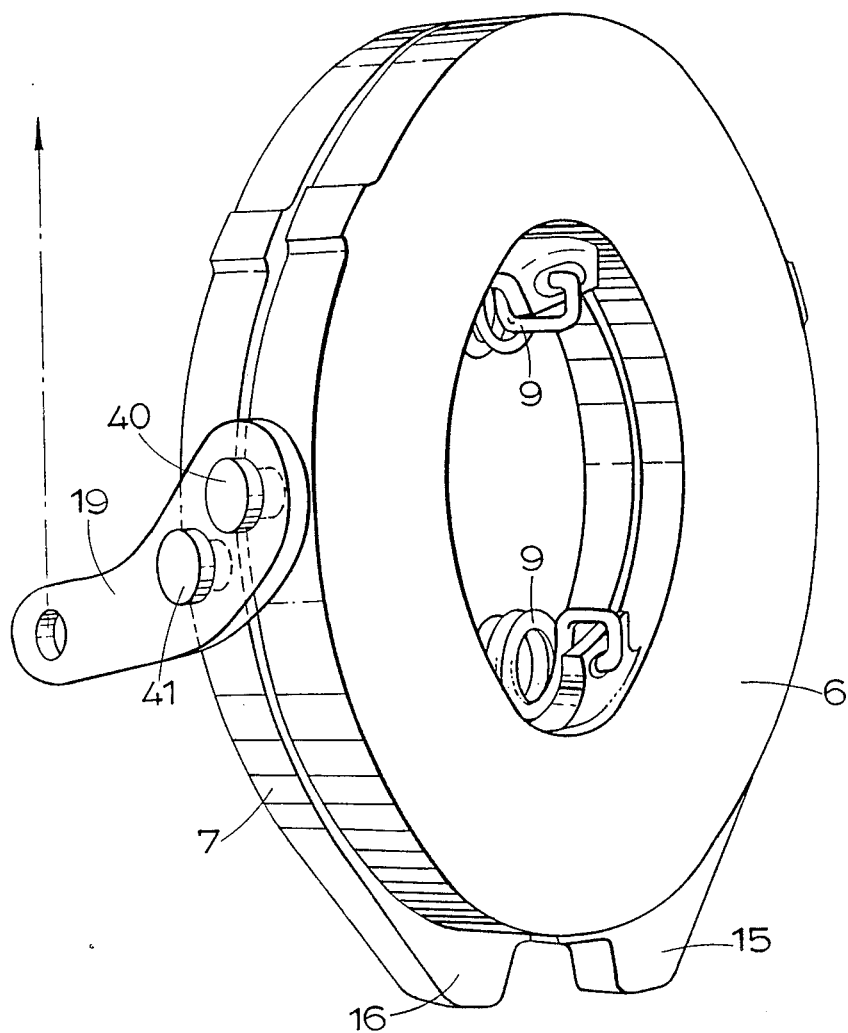
FIG. 10 is a perspective view of an actuator assembly for a disc brake of the kind set forth.
Figure 11:
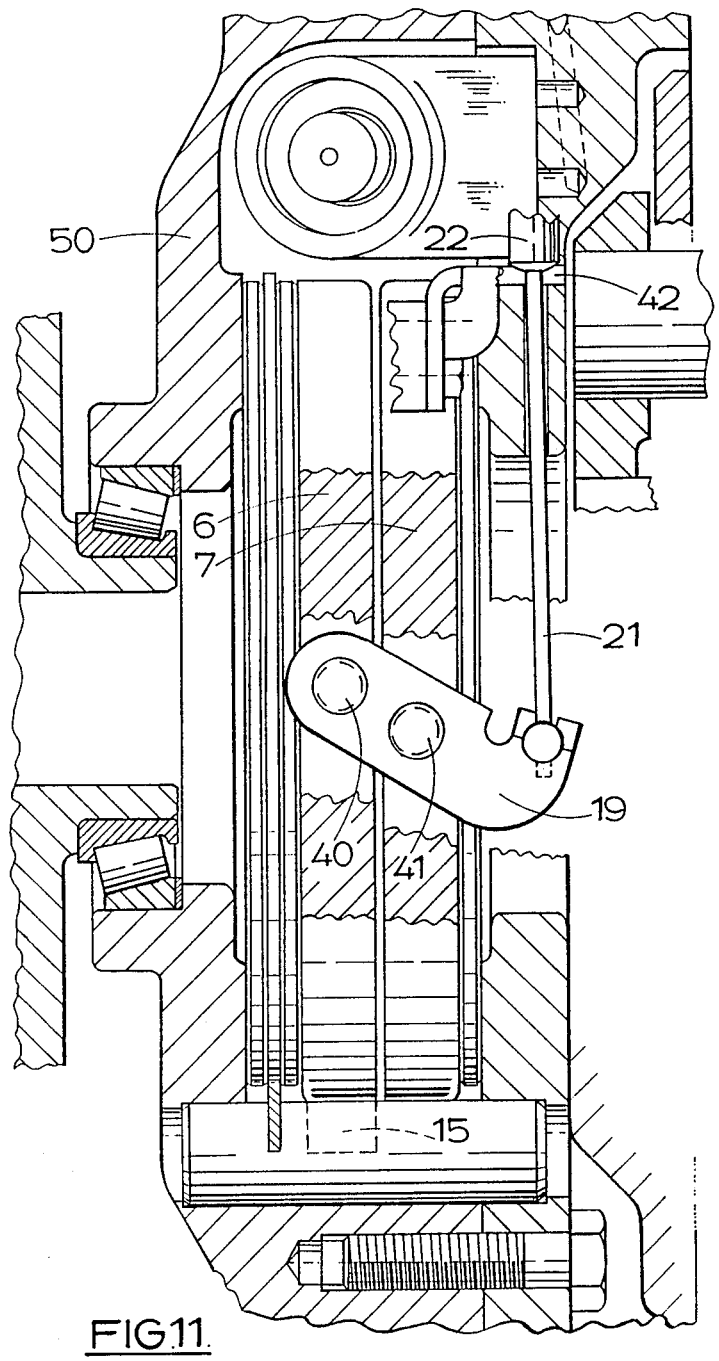
FIG. 11 is a plan of the actuator assembly installed in the brake.
Figure 12:
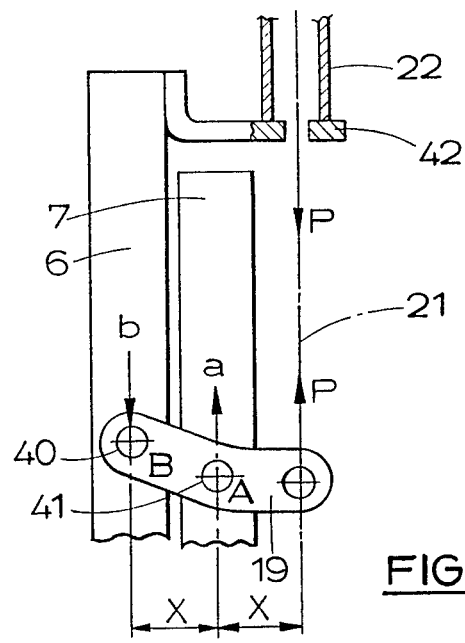
FIG. 12 is a schematic of the view of FIG. 11.

In the brake illustrated in FIGS. 10–12 of the accompanying drawings the lever 19 lies in a plane tangential to the two plates 6, 7 and is pivotally connected to the peripheral edges of both plates by means of pivot pins 40 and 41 respectively. The free end of the lever 19 extends axially away from the plate 7 and is coupled to the free end of the inner member 21. The outer casing 22 abuts against an abutment comprises a lug 42 carried by the plate 6 and extending axially over the peripheral edge of the plate 7.

In the application of the brake a pull applied to the cable assembly acts to move the lever angularly abut the pivot pin 41 as an axis with the opposite end acting on the plate 6 through the pivot pin 40. This moves the plates angularly in opposite directions.

The reactions on the lever 19 can be expressed as follows:

$$P \times 2x = ax$$

$$\therefore a = 2P$$

also $$bx = Px$$

$$\therefore b = P$$

The forces on the actuator are:

at $A = a = 2P$ at $B = B + P = 2P$

It follows, therefore, that equal forward and reverse performance is achieved.

Figure 13:
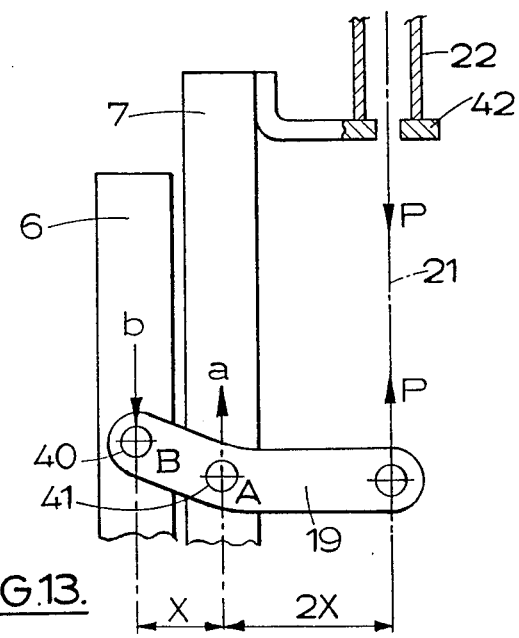
FIG. 13 is a view similar to FIG. 12 but of a modified construction.
Figure 14:
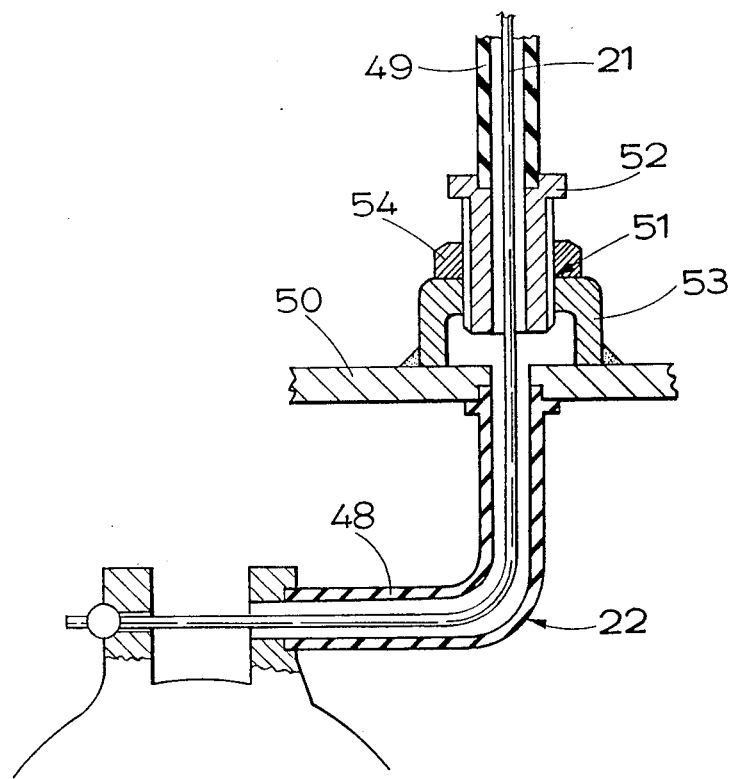
FIG. 14 shows a mounting for the outer end of the cable assembly including an adjuster.

In the modified construction illustrated in FIG. 13 the abutment lug 42 is carried by the pressure plate 7.

In this construction, the reactions on the lever 19 are:

$$P \times 3x = ax$$

$$\therefore a = 3P$$

also $$bx = P \times 2x$$

$$\therefore b = 2P$$

The forces on the actuator are:

at $A = a - P = 2P$ at $B = b = 2P$

Thus equal forward and reverse performance is also achieved.

In the embodiments described above the outer casing may be separated into an inner section 48 and an outer section 49. The outer end of the inner section 48 abuts against an abutment on the housing 50, and the inner end of the outer section 490 co-operates with an automatic adjust 51. As illustrated the adjuster 51 comprises an adjuster screw 52 which is adjustably screwed through a tapped opening in a spacer 53 mounted on the housing 50, and is secured against movement by a locknut 53.

After the locknut 53 has been released, the adjuster screw 52 can be screwed relative to the spacer 53 to adjust the effective length of the casing 22, in turn to adjust the braking clearances to compensate for wear of the friction linings.

Although not illustrated, it is be be understood the inner end of the casing section 48 and the member 21 both co-operate with a lever, such as the lever 17 in the embodiments described above.

We claim:

1. A self-energising disc brake comprising a housing, first and second axially spaced braking surfaces in said housing, radial pilot lugs and a drag-taking stop abutment in said housing, first and second pressure plates centred on said pilot lugs, first and second actuator lugs provided respectively on said first and second pressure plates, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plates and said braking surfaces carried by opposite faces of said discs, and brake-applying means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried round with said discs until one of said plates is arrested by the engagement of a lug on that plate with said drag-taking stop abutment, whereafter continued angular movement of the other of said plates provides a servo action, wherein said brake-applying means comprises a lever for moving said plates angularly in opposite directions, a cable-assembly which acts through said lever to move said plates angularly in opposite directions, and the cable assembly comprising an outer casing having an abutment on one of said plates and an internal, inextensible, flexible member which slides in said casing and is coupled to said lever.

2. A disc brake as claimed in claim 1, wherein said lever is disposed in a plane lying between said plates.

3. A disc brake as claimed in claim 1, wherein said lever lies in a plane which is tangential to said plates.

4. A disc brake as claimed in claim 2, wherein said lever comprises a bell-crank lever of which one arm has a curved nose acting of the said plate with which said cable assembly is not in abutment.

5. A disc brake as claimed in claim 4, wherein a pivot is provided on the said plate carrying the abutment for said cable assembly and said lever is pivotally mounted on said pivot.

6. A disc brake as claimed in claim 5, wherein said lever is provided with a curved reaction face which co-operates with an adjacent one of said rolling bodies to impart a force to a respective one of said plates by the co-operation of the said body with said complementary recess in the the said respective plate.

7. A disc brake as claimed in claim 5 wherein said other plate has an abutment face, and said lever co-operates with said abutment face.

8. A disc brake as claimed in claim 6, wherein said lever is provided with an opening which receives the adjacent one of said rolling bodies and which defines a pivotal connection for said lever between said two plates as said lever is moved angularly by said cable assembly to initiate application of the brake.

9. A disc brake as claimed in claim 8, wherein said cable assembly lies on a chord passing between said pressure plates.

10. A disc brake as claimed in claim 8, wherein said cable assembly is tangential to said plates.

11. A disc brake as claimed in claim 6, wherein said lever is pivotally connected to both said plates.

12. A disc brake as claimed in claim 11, wherein said lever has a free end which projects axially from said plates which is coupled to said inextensible member with said outer casing in abutment with an abutment on one of said plates.

13. A disc brake as claimed in claim 3, wherein said lever is pivotally connected to the peripheral edges of both plates by means of pivot pins.

14. A disc brake as claimed in claim 13, wherein said lever has a free end which extends axially away from one of said plates and is coupled to the free end of said inextensible member.

* * * * *

UNITED STATES PATENT AND TRADEMARK OFFICE
CERTIFICATE OF CORRECTION

PATENT NO. : 4,768,624

DATED : September 6, 1988

INVENTOR(S) : Andrew P. Green, et al.

It is certified that error appears in the above—identified patent and that said Letters Patent is hereby corrected as shown below:

First Page, Left Column, Item 73 should read:

[73]  Assignee:  Lucas Industries public limited company, Birmingham, England

Signed and Sealed this

Twenty-eighth Day of November 1989

*Attest:*

JEFFREY M. SAMUELS

*Attesting Officer*     *Acting Commissioner of Patents and Trademarks*